(12) United States Patent
Kvamme et al.

(10) Patent No.: US 7,812,094 B2
(45) Date of Patent: Oct. 12, 2010

(54) POLYMER BLEND

(75) Inventors: Lars Inge Kvamme, Langesund (NO); Hans Georg Daviknes, Stathelle (NO); Jorunn Nilsen, Porsgrunn (NO); Irene Helland, Porsgrunn (NO)

(73) Assignee: Borealis Technology OY, Porvoo (FI)

(*) Notice: Subject to any disclaimer, the term of this patent is extended or adjusted under 35 U.S.C. 154(b) by 0 days.

(21) Appl. No.: 12/309,301

(22) PCT Filed: Jul. 12, 2007

(86) PCT No.: PCT/EP2007/006197

§ 371 (c)(1),
(2), (4) Date: Oct. 14, 2009

(87) PCT Pub. No.: WO2008/006586

PCT Pub. Date: Jan. 17, 2008

(65) Prior Publication Data

US 2010/0047599 A1 Feb. 25, 2010

(30) Foreign Application Priority Data

Jul. 14, 2006 (EP) .................................. 06253715

(51) Int. Cl.
*C08L 23/04* (2006.01)
(52) U.S. Cl. ........................................... 525/240
(58) Field of Classification Search ................. 525/240
See application file for complete search history.

(56) References Cited

U.S. PATENT DOCUMENTS

| | | | | |
|---|---|---|---|---|
| 5,149,738 A * | 9/1992 | Lee et al. | ............ | 525/53 |
| 6,645,588 B1 * | 11/2003 | Leiden et al. | ............ | 428/35.8 |
| 2004/0242785 A1 * | 12/2004 | Palmlof | ............ | 525/240 |

FOREIGN PATENT DOCUMENTS

| | | |
|---|---|---|
| EP | 0260130 | 3/1988 |
| EP | 0308088 | 3/1989 |
| EP | 0423101 | 10/1990 |
| EP | 0517222 | 9/1992 |
| EP | 0537130 | 4/1993 |
| EP | 0688794 | 12/1995 |
| EP | 0810235 | 12/1997 |
| EP | 1555292 | 7/2005 |
| EP | 1878764 | * 1/2008 |
| WO | WO 9535323 | 12/1995 |
| WO | WO 9728170 | 8/1997 |
| WO | WO 9846616 | 10/1998 |
| WO | WO 9849208 | 11/1998 |
| WO | WO 9856831 | 12/1998 |
| WO | WO 9912981 | 3/1999 |
| WO | WO 9919335 | 4/1999 |
| WO | WO 9941310 | 8/1999 |
| WO | WO 9951646 | 10/1999 |
| WO | WO 0022040 | 4/2000 |
| WO | WO 0034341 | 6/2000 |
| WO | WO 0155230 | 8/2001 |
| WO | WO 03085044 | 10/2003 |
| WO | WO 03106510 | 12/2003 |
| WO | WO 2004/067654 | * 8/2004 |
| WO | WO 2008006586 | 1/2008 |

OTHER PUBLICATIONS

PCT/EP2007/006197, Jan. 17, 2008, International Search Report.
PCT/EP2007/006197, Jan. 14, 2009, Written Opinion.
PCT/EP2007/006197, Jan. 14, 2009, International Preliminary Report on Patentability.
Heino, E.L., Lehtinen, A., Tanner J., Seppdla J., Neste Oy, Porvoo, Finland, "Rheological characterization of polyethylene fractions", Theor. Appl. Rheol., Proc. Int. Congr. Rheol. 11th (1992), 1, 360-362.
Heino, E.L., Borealis Polymers Oy, Porvoo, Finland, "The influence of molecular structure on some rheological properties of polyethylene", Annual Transactions of the Nordic Rheology Society, 1995.

* cited by examiner

*Primary Examiner*—Bernard Lipman
(74) *Attorney, Agent, or Firm*—Ballard Spahr LLP

(57) ABSTRACT

The invention relates to a polymer blend suitable for the production of film, said polymer blend comprising at least (1) a multimodal high density polyethylene (HDPE) composition and (2) a low density polyethylene (LDPE) polymer, a linear low density polyethylene (LLDPE) polymer or a mixture of LDPE and LLDPE polymers, said HDPE composition comprising a multimodal HDPE polymer which contains at least a lower molecular weight (LMW) polyethylene component and a higher molecular weight (HMW) polyethylene component.

17 Claims, No Drawings

POLYMER BLEND

CROSS-REFERENCE TO RELATED APPLICATIONS

The present application is a National Phase Application of International Application No. PCT/EP2007/006197, filed Jul. 12, 2007, which claims priority to European Patent Application No. 06253715.4 filed Jul. 14, 2006, which applications are incorporated herein fully by this reference.

This invention relates to a blend of a multimodal high density polyethylene polymer (HDPE) composition with at least one other polymer, preferably with an LDPE and/or LLDPE polymer, to multimodal high density polyethylene polymer (HDPE) composition itself, to a mono- or multilayer film comprising said blend or composition, as well as to a process for preparing films, preferably shrink films comprising the blend or composition.

HDPE is widely used in the manufacture of films for a range of applications (e.g. shrink film, shopping bags, pouches, refuse sacks, liners). HDPE films are also commonly used in food packaging and are used in multilayer coextrusion processes.

A significant amount of films formed using HDPE's also comprise low density polyethylene (LDPE). As well known, LDPE's are very different polymers from, for example, linear low density polyethylene polymers (LLDPE). An LDPE polymer is formed in a high pressure radical process whereas LLDPE's are ethylene copolymers formed using coordination catalysts such as metallocenes, chromium catalysts or Ziegler-Natta catalysts. LDPE and LLDPE are terms of the art and will be readily understood by the skilled man.

LDPE generally possesses excellent processability but gives rise to films having poor mechanical properties. It is known therefore that LDPE and HDPE polymers can be mixed and used to form films having useful mechanical properties from a mixture that is readily processed.

HDPE has also been combined with LLPDE to form films. WO96/18678 teaches that films comprising high molecular weight HDPE combined with small amounts of metallocene-catalysed LLDPE (linear low density polyethylene) have improved tear resistance.

However, compatibility between the LDPE or LLDPE and HDPE polymers is often a problem and lack of homogeneity in the blend leads to reduced mechanical properties in the film and poorer optical properties. Blending HDPE with LLDPE or LDPE is often difficult due to their inherent differences in viscosity and hence the films which are formed from this mixture tend to be inhomogeneous.

Moreover, to date such blends have not been capable of being formed into films with high production rates. For economic reasons, however, there is also a continuous need for polymer materials which can be produced with high production speed to films.

The object of the present invention is to provide a further HDPE polymer composition suitable for producing films with increased film production speeds. Moreover, films comprising the HDPE polymer composition of the invention also preferably provide highly advantageous shrink properties. Furthermore, it is also preferable if said films have very good mechanical properties. Very feasible optical properties may also be obtained, if desired.

When used in blends, the HDPE polymer composition of the invention enables, in conjunction with the other polymer materials present, a property balance which is useful in many end applications, especially in films, such as shrink films. The term "shrink film" is well-known in the art and widely used in the polymer film field.

Thus, the invention provides a multimodal high density polyethylene composition suitable for the production of a film, said HDPE composition comprising a multimodal HDPE polymer which contains at least a lower molecular weight (LMW) polyethylene component and a higher molecular weight (HMW) polyethylene component, wherein said HDPE polymer has a $MFR_2$ of 0.6 g/10 min or less when determined according to ISO 1133 at 190° C. at load of 2.16 kg and a density of at least 935 kg/m$^3$.

The use of the HDPE composition of the invention as defined above alone or in blends with other polymers for preparing a mono- or multilayer film is also provided. Preferably, the HDPE composition of the invention as defined above is used in a polymer blend for preparing said film. The obtained blends are very homogeneous.

The invention thus further provides a polymer blend comprising (1) a multimodal HDPE composition as defined above and (2) one or more further polymer, particularly an alpha olefin polymer, components. More preferably, the (2) one or more further polymer is a LDPE polymer, LLDPE polymer or a mixture of LDPE and LLDPE polymers.

The present inventors have surprisingly found that said multimodal HDPE composition when used as such, or as blended with other polymer materials, can be processed to a film in highly desirable draw down ratios, thereby enabling the production of thinner films, when desired. Thus high production speeds, i.a. in terms of film metre/min, can be achieved.

Preferably, HDPE composition of the invention is blended at least with an LDPE polymer.

The draw down property of the composition or blend of the invention is excellent compared to a pure LDPE or a blend of LDPE and LLDPE. Thus the present invention further provides the use of the HDPE composition of the invention for improving the processability, and preferably also for improving mechanical and/or optical properties of films comprising LDPE and/or LLDPE polymers.

Further preferably, the composition or blend of the invention provides films with highly advantageous mechanical properties. Namely, in addition to beneficial draw down properties, the composition or blend of the invention can have advantageous shrink properties. The inventors have found that films produced from the HDPE composition or blends of the HDPE composition and another polymer, preferably at least LDPE, provide an optimal balance between shrink force in transverse and machine direction at cold shrink forces said balance being at least comparable, if not improved, to that obtained using LDPE alone, or using LDPE blended with LLDPE.

The composition or blend of the invention may additionally provide films with further excellent mechanical properties, especially with increased stiffness expressed as tensile modulus.

Moreover, the composition or blend of the invention enables the preparation of thinner films compared to conventional LDPE- or LDPE/LLDPE-films, while maintaining the mechanical properties in the same level as said conventional thicker LDPE- or LDPE/LLDPE-films.

Surprisingly, the composition or blend of the invention with a multimodal HDPE composition provides draw down and mechanical properties, i.a. shrink properties, that are at a similar level, if not improved, compared to conventionally used blends of LDPE in which for example HDPE prepared using a Cr-catalyst is employed.

The term "blend" as used herein covers the mechanical blends obtainable by admixing one or more of the components mechanically together, and in-situ blends, wherein the components are mixed together during the polymerisation process thereof, as well as any combinations of mechanical and in-situ blends.

Preferably the blend of the invention is a mechanical blend obtainable by blending the multimodal HDPE composition (1) at least with a LDPE polymer (2).

The blend of the invention comprises typically up to 30% by weight (wt %), preferably 1 to 20 wt %, more preferably 5 to 15 wt % of the multimodal HDPE composition (1) of the total amount of the blend, and at least 70 wt %, preferably 80 to 99 wt %, more preferably 85 to 95 wt %, of the other polymer component (2), which is preferably a LDPE polymer, a LLDPE polymer or a mixture of LDPE and LLDPE polymers.

In case of said mixture of LDPE and LLDPE polymers, the weight proportion of the LDPE polymer is at least 60 wt % of the total amount of said mixture, and the amount of the LLDPE polymer is thus up to 40 wt % of the total amount of said mixture.

Preferably, the film of the invention comprises said blend of a multimodal HDPE composition (1) together with a LDPE polymer and, optionally, with LLDPE. Thus the component (2) of the blend comprises preferably at least the LDPE polymer, and depending on the end application, can also comprise LLDPE.

The invention further provides a film comprising at least one layer comprising the composition or blend of the invention as defined above. The film can be a mono- or multilayer film structure. The multilayer film as used herein can comprise two or more layers.

In case of multilayer film, at least one layer of said multilayer film comprises the composition or blend of the invention. Naturally, a multilayer film may comprise two or more layers which contain the composition or blend of the invention. Moreover, the composition or blend in two or more layers of a multilayer film can comprise the same or different components in same or different amounts.

In one embodiment, the invention provides a multilayer film, preferably blown multilayer film, comprising at least two adjacent layers of which one layer comprises, or consists of, a multimodal HDPE composition comprising a multimodal HDPE polymer which contains at least a LMW polyethylene component and a HMW polyethylene component, wherein said HDPE polymer has a $MFR_2$ of 0.6 g/10 min or less, when determined according to ISO 1133 at 190° C. at load of 2.16 kg, and a density of at least 935 kg/m³. The subranges and further properties of the HDPE polymer of this embodiment are as defined herein above and below for component (1).

The invention provides also a process for the preparation of a mono- or multilayer film comprising extruding a multimodal HDPE composition of the invention as defined above or below to form a film layer. The film extrusion includes the cast film and blown film extrusion of the HDPE composition as such or of a blend of the invention. In case of multilayer film, it is preferably formed by coextrusion.

The HDPE composition as hereinbefore defined can be prepared by blending the LMW and HMW components, optionally with other components of the HDPE composition, mechanically together or by blending of at least LMW and HMW components of said HDPE composition in-situ during the preparation process thereof. The latter route is preferred.

Usually, a HDPE polymer comprising at least two polyethylene fractions, which have been produced under different polymerisation conditions resulting in different (weight average) molecular weights and molecular weight distributions for the fractions, is referred to as "multimodal". Accordingly, the polymers of the composition of the invention are multimodal polyethylenes. The prefix "multi" relates to the number of different polymer fractions present in the polymer. Thus, for example, a polymer consisting of two fractions only is called "bimodal". The form of the molecular weight distribution curve, i.e. the appearance of the graph of the polymer weight fraction as function of its molecular weight, of a multimodal polyethylene will show two or more maxima or at least be distinctly broadened in comparison with the curves for the individual fractions. For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima or at least be distinctly broadened in comparison with the curves for the individual fractions.

In any multimodal polymer there is by definition a lower molecular weight component (LMW) and a higher molecular weight component (HMW). The LMW component has a lower molecular weight than the higher molecular weight component. Preferably, in the HDPE polymer of the invention at least one of the LMW and HMW components is a copolymer of ethylene.

Further preferably, one of LMW and HMW components is an ethylene homopolymer. Ideally, the lower molecular weight (LMW) component may be an ethylene copolymer or homopolymer, more preferably a homopolymer. The higher molecular weight (HMW) component is preferably an ethylene copolymer.

The term "ethylene copolymer" as used herein is intended to encompass polymers comprising repeat units deriving from ethylene and at least one other monomer. The amount of the comonomer present in the copolymer is typically at least 0.25 mol-%, preferably at least 0.5 mol-%, such as up to 10 mol-%. Ethylene forms the majority of the copolymer.

In contrast the term "ethylene homopolymer" as used herein is intended to encompass polymers which consist essentially of repeat units deriving from ethylene. Homopolymers may, for example, comprise at least 99.8%, preferably at least 99.9%, by weight of repeat units deriving from ethylene.

As used herein the term "HDPE polymer" is intended to cover polyethylene having a density of at least 935 kg/m³, typically of at least 940 kg/m³, e.g. 940 to 980 kg/m³, preferably in the range of from 942 to 950 kg/m³, especially 943 to 948 kg/m³, e.g. 945 kg/m³.

The HDPE polymer of the HDPE composition typically has a $MFR_2$ of 0.6 g/10 min or less, preferably 0.5 g/10 min or less, e.g. 0.01 to 0.49 g/10 min, preferably 0.1 to 0.48 g/10 min, especially 0.2 to 0.45 g/10 min, e.g. 0.2 to 0.4 g/10 min as measured according to ISO 1133 at 190° C. and under 2.16 kg load.

FRR21.6/2.16 (The Flow Rate ratio of MFR values measured by ISO 1133 at 190° C. and under 21.6 kg and 2.16 kg loads, $MFR_{21.6}/MFR_{2.16}$) is typically more than 10, the upper limit being e.g. less than 200. Preferably FRR21.6/2.16 is between 50 and 150, e.g. of 70 to 100.

The other properties of the multimodal HDPE polymer of the invention can be varied and tailored depending on the desired end application.

The HDPE polymer of the invention preferably possesses a broad molecular weight distribution. This can be expressed using the rheological behaviour which can be described with a certain level of SHI(2.7/210). The SHI also indicates the good processability of the HDPE.

The HDPE polymer of the HDPE composition should have an SHI(2.7/210) of 20 or more, preferably 25 or more. The upper limit thereof is not limited, but may be less than 50. Depending on the end application the ranges for SHI (2.7/210) may in certain embodiments be 20 to 45, e.g. 25 to 40.

The broad molecular weight distribution of the HDPE polymer of the invention can also be expressed using its Mw/Mn. Thus the Mw/Mn of the HDPE polymer of the HDPE composition may be 10 or more, such as 10 to 30, preferably 12 or more, e.g. 14 to 18.

The weight average molecular weight of preferred HDPE polymers of the HDPE composition is more than 80,000, the upper limit being e.g. 500,000, more preferably in the range 100,000 to 300,000, still more preferably 170,000 to 250,000. Its Mn may be in the range 5000 to 30,000, preferably 8000 to 15,000.

The HDPE polymer of the HDPE composition preferably has a crystalline melting point between 120 to 150° C. (as determined by DSC analysis ISO 11357/03). The crystallinity of the HDPE polymer is preferably 55 to 90% as determined by DSC analysis.

A further measure of the broadness of the molecular weight distribution is the polydispersity index (PI). For the high density polyethylene polymer of the composition of the invention, PI is preferably more than 0.5, the upper limit being e.g. 5, suitably in the range 0.5 to 3.5, especially 1.5 to 3. The rheological behaviour of polymers is a further indicator of the mechanical properties and the processability of the polymer.

The HDPE polymer of the composition of the invention may possess G' values at 5 kPa of higher than 2000 and typically less than 2800. G' value indicates the elasticity behaviour of the polymer.

The LMW component of the HDPE polymer preferably has a density of more than 950 kg/cm$^3$, preferably 950 to 980 kg/cm$^3$, preferably 960 to 975 kg/m$^3$. The LMW component preferably has a MFR$_2$ of 20 to 1000 g/10 min, preferably 30 to 800 g/10 min, still more preferably 30 to 500 g/10 min (ISO 1133 at 190° C. under 2.16 kg load), for example 50 to 500 g/10 min. The molecular weight of the LMW component is preferably in the range from 5,000 to 50,000, e.g. 20,000 to 40,000. Preferred molecular weight distribution values for the LMW component are 2 to 50, more preferably 5 to 30 (GPC).

The HMW component should have a lower MFR$_2$ and a lower density than the LMW component that is present in the HDPE polymer. The MFR$_2$ and density are such that the final HDPE polymer has the desired preset values. The weight average molecular weight of the HMW component preferably ranges from 150,000 to 500,000, e.g. 200,000 to 400,000.

The weight ratio between the LMW and HMW components (LMW:HMW) in the HDPE polymer of the invention is 10:90 to 90:10, preferably LMW:HMW of 40:60 to 60:40, more preferably 42:58 to 58:42.

The comonomer used in the HMW component (and if present the LMW component) is preferably a C3-12 alpha olefin or a mixture of two or more C3-12 alpha olefins, e.g. 1-butene, 1-pentene, 1-hexene, 4-methyl-1-pentene, 1-heptene, 1-octene, 1-nonene and 1-decene, with 1-butene and 1-hexene being preferred. 1-butene is especially preferred. The amount of comonomer present in the HMW component is preferably 0.25 to 5 mol-%, especially 0.3 to 3 mol-%.

A preferred HDPE polymer for use in the invention has a total comonomer content of 0.5 to 5 wt % relative to ethylene, more preferably 0.5 to 3 mol-%, e.g. up to 2.5 mol-% relative to ethylene (as measured by FTIR).

In one embodiment the HDPE composition comprises only the above defined HDPE polymer.

Alternatively, the HDPE composition may comprise other polymer components. In this regard, the HDPE polymer may comprise other polymer components, e.g. up to 10% by weight of a well known polyethylene prepolymer (obtainable from a prepolymerisation step as well known in the art). In case of such prepolymer, one of LMW and HMW components, preferably LMW component as defined above comprises said prepolymer component.

Multimodal HDPE polymers for use in the invention are preferably prepared by forming the LMW and HMW components, in any order, in-situ in a sequential multistage process, for example, by two or more stage polymerisation using the same catalyst, or by the use of two or more different polymerisation catalysts and/or different polymerisation conditions in a one stage polymerisation. In principle any polymerisation method including solution, slurry and gas phase polymerisation can be used for producing the high density polyethylene polymer. The temperature in the polymerisation reactor needs to be sufficiently high to reach an acceptable activity of the catalyst. On the other hand, the temperature should not exceed the softening temperature of the polymer.

Preferably, however, at least the LMW and HMW components of the HDPE polymer are produced in a two or three stage polymerisation. Suitable polymerisation processes include liquid phase polymerisation, e.g. solution or slurry polymerization, preferably in the presence of a diluent (or optionally carried out in bulk), and a gas phase polymerisation.

In one preferable embodiment one of the above mentioned LMW and HMW components is polymerised as a slurry polymerisation (e.g. in a slurry tank or loop reactor) and the other as a slurry or gas phase, preferably gas phase, polymerisation (e.g. in a gas reactor), in any order.

Multimodal HDPE polymers for use in the present invention are preferably produced in such a reactor system. Particularly preferably the multimodal HDPE polymer is formed at least in a two stage process comprising a slurry loop polymerisation followed by a gas phase polymerization. A preferred loop reactor-gas phase reactor system usable in this invention is generally known as BORSTAR® reactor system. The multistage polymerization is preferably carried out using the same catalyst system in each stage. Moreover, the LMW component is preferably polymerised in the slurry reactor, preferably in a loop reactor, and the HMW component in the gas phase reactor in the presence of the reaction product of the slurry reactor.

The conditions used in such processes are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. Preferred diluents include hydrocarbons such as propane or isobutane. Hydrogen is also preferably fed into the reactor to function as a molecular weight regulator.

If gas phase reactions are employed then conditions are preferably as follows:

the temperature is within the range of 50° C. to 130° C., preferably between 60° C. and 115° C., the pressure is within the range of 10 bar to 60 bar, preferably between 10 bar to 40 bar, hydrogen can be added for controlling the molar mass in a manner known per se, the residence time is typically 1 to 8 hours.

The gas used will commonly be a non-reactive gas such as nitrogen or low boiling point hydrocarbons such as propane together with monomer (e.g. ethylene).

If desired, the polymerisation may be effected in a known manner under supercritical conditions in the slurry, preferably loop reactor, and/or as a condensed mode in the gas phase reactor.

The gas phase polymerisation may be conducted ma manner known in the art, such as in a bed fluidised by gas feed or in mechanically agitated bed. Also fast fluidisation may be utilised.

Preferably, the lower molecular weight polymer fraction is produced in a continuously operating loop reactor where ethylene is polymerised in the presence of a polymerisation catalyst as stated below and a chain transfer agent such as hydrogen. The diluent is typically an inert aliphatic hydrocarbon, preferably isobutane or propane.

The higher molecular weight component can then be formed in a gas phase reactor, preferably using the same catalyst.

The multistage process wherein the LMW component as defined above is produced in a slurry process and the HMW component is produced in a gas phase reactor in the presence of the LMW component of the previous step, results in a particularly preferable combination.

The process is typically carried out as a continuous process.

Thus, viewed from a further aspect, the invention provides a process for the preparation of a HDPE polymer as herein before defined comprising in a first liquid phase stage, polymerising ethylene and optionally at least one C3-12 alpha-olefin in the presence of a polymerisation catalyst to form a LMW component and subsequently polymerising ethylene and at least one C3-12 alpha-olefin in the gas phase using a polymerisation catalyst, preferably in the presence of the reaction product obtained from the first liquid stage, to form a HMW component.

A prepolymerisation step may be included in a well known manner before the above described actual polymerisation steps to provide the prepolymer component mentioned above.

The type of catalyst used is not critical. Preferably a coordination catalyst such as a Ziegler Natta catalyst or a single site catalyst (including well known metallocenes and non-metallocenes) is used.

In a preferred embodiment the multimodal HDPE polymer is prepared using a Ziegler Natta (ZN) catalyst, e.g. a conventional ZN catalyst Preferred Ziegler-Natta catalysts comprise a transition metal component and an activator. The transition metal component comprises a metal of Group 4 or 5 of the Periodic System (IUPAC) as an active metal. In addition, it may contain other metals or elements, like elements of Groups 2, 13 and 17. Preferably, the transition metal component is a solid. More preferably, it has been supported on a support material, such as inorganic oxide carrier or magnesium halide. Examples of such catalysts are given, among others in WO 95/35323, WO 01/55230, EP 810235 and WO 99/51646. The catalysts disclosed in WO 95/35323 are especially useful as they are well suited in production of both a polyethylene having a high molecular weight and a low molecular weight component. Thus, especially preferably the transition metal component comprises a titanium halide, a magnesium alkoxy alkyl compound and an aluminium alkyl dihalide supported on an inorganic oxide carrier.

In one embodiment a catalyst of Ziegler Natta type, wherein the active components' are dispersed and solidified within a Mg-based support by an emulsion/solidification method adapted for polyethylene catalysts, e.g. as disclosed in WO03/106510 of Borealis is used, e.g. according to the principles given in the claims thereof.

In another preferable embodiment, the catalyst is a non-silica supported catalyst, i.e. the active components are not supported on an external silica support. Preferably, the support material of the catalyst is a Mg-based support material. Examples of such preferred Ziegler-Natta catalysts are described in EP 0 810 235. Multimodal (e.g. bimodal) polymers can also be made by mechanical blending of the polymer components in a known manner.

In a very preferable embodiment of the invention the polyethylene composition is produced using a ZN catalyst disclosed in EP 688794.

Conventional cocatalysts, supports, carriers, electron donors may also be used. Preferably the same catalyst is used throughout the polymerisation.

Where a metallocene catalyst is used, the preparation of the metallocenes can be carried out according or analogously to the methods known from the literature and is within skills of a person skilled in the field. Thus for the preparation see e.g. EP-A-129 368, examples of compounds wherein the metal atom bears a —NR"2 ligand see i.a. in WO-A-9856831 and WO-A-0034341. For the preparation see also e.g. in EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130.

Suitable preparation methods of the polyethylene polymer as defined above is described e.g. in WO 99/41310 the content of which is incorporated herein by reference.

As mentioned above, typical polymers which may be present as the component (2) of the blend of the invention include LDPE polymers, LLDPE polymers and a mixture of one or two LDPE and LLDPE polymers.

As to LDPE polymers which can be used preferably have the following properties:

The LDPE polymer may have a density of 915-935 kg/m$^3$, especially 918 to 930 kg/m$^3$, e.g. 920 to 930 kg/m$^3$. The MFR$_2$ of the LDPE may range from 0.1 to 4 g/10 min, e.g. 0.2 to 2.5 g/10 min, e.g. 0.2 to 2.0 g/10 min. Suitable LDPE's are commercially available from Borealis and other suppliers or they can be produced in a well known high pressure polymerisation process, e.g. in HP autoclave process, in a manner known in the art.

As to LLDPE polymers which can be used preferably have a density of less than 940 kg/m$^3$, preferably less than 935 kg/m$^3$, e.g. 905-935 kg/m$^3$, preferably in the range of from 915 to 934 kg/m$^3$, such as 918 to 934 kg/m$^3$, e.g. 920 to 930 kg/m$^3$ (ISO 1183).

The LLDPE polymer may be formed from ethylene along with at least one C3-12 alpha-olefin comonomer, e.g. butene, hexene or octene. Preferably, the LLDPE is an ethylene hexene copolymer, ethylene octene copolymer or ethylene butene copolymer. The amount of comonomer incorporated in the LLDPE copolymer is preferably 0.5 to 12 mol %, e.g. 1 to 10% mole, especially 1.5 to 8% mole.

The MFR$_2$ (melt flow rate ISO 1133 at 190° C. under a load of 2.16 kg) of the LLDPE polymer should preferably be in the range 0.5 to 10, preferably 0.8 to 6.0, e.g. 0.9 to 2.0 g/10 min.

It is within the scope of the invention for the LLDPE to be a multimodal LLDPE, e.g. a bimodal LLDPE. The possibility of using mixtures of LLDPE's is also covered, e.g. a unimodal LLDPE and a bimodal LLDPE.

Suitable LLDPE's can be produced analogously to polymerisation process described above for HDPE polymer by adjusting the process conditions, such as ethylene, comonomer and hydrogen feed, polymerisation pressures and temperatures etc, in a known manner to provide the desired LLDPE properties including density and MFR values.

As in case of the HDPE polymer of the invention, also the LLDPE can be produced using any catalyst, preferably a coordination catalyst, such as ZN or single site catalyst which includes metallocenes (mcn). Usable ZN-based and mcn-based LLDPE's are also commercially available from Borealis and other suppliers.

Although LDPE and LLDPE are mentioned as preferable polymers, the polymer of the component (2) of the blend is not limited therein, but in place of LDPE and/or LLDPE, or additionally with LDPE and/or LLDPE, the component (2) can be selected from one or more of other polymers including other HDPE polymers, MDPE polymer, homopolymer or random copolymer of propylene, heterophasic blockpolymer of propylene, e.g. ethylene-propylene rubber etc. Typically, however, the blend consists of the component (1), which preferably consists of a multimodal HDPE polymer as defined above, and the component (2) which preferably consists of LDPE polymer, LLDPE polymer or a mixture thereof.

The HDPE composition and the blend of the invention as hereinbefore described are highly suitable for producing mono- or multilayer films, including cast films and blown film extrusion, which extrusion includes coextrusion in case of multilayer films. The films of the present invention may comprise more than one layer and/or have any thickness.

In one embodiment the one film layer consists of the blend of the invention which consists of (1) the HDPE composition, (2) the LDPE polymer and, optionally, LLDPE polymer, as defined above.

The amounts of (1) the HDPE composition and (2) the other polymer component (2) in a film layer are as defined above for the blend of the invention, i.e. the amount of (1) the HDPE composition is up to 30 wt %, preferably up to 20 wt %, such as 5 to 15 wt %, of the total amount of said blend present in the layer. The amount of (2) LDPE polymer, LLDPE polymer or a mixture thereof is at least 70 wt %, preferably at least 80 wt %, such as 85 to 95 wt %, of the total amount of said blend in the layer. If component (2) is a mixture of LDPE and LLDPE, then the weight ratio of LDPE to LLDPE is typically up to 40 wt % of LLDPE and at least 60 wt % of LDPE based on the total amount of said mixture.

The film of the invention may comprise conventional additives such as antioxidants, heat stabilisers, slip agents, UV stabilisers, colourings, lubricants as well as polymer processing agent Said additives can be added to each individual component (1) and/or (2) before forming the blend, and/or can be added to the blend after admixing the components (1) and (2), before or during the processing of the blend to a film of the invention.

The films of the present invention may comprise a single layer or may be multilayered (e.g. comprise 2 to 7 layers). Multilayer films comprise typically 2 to 5 layers, especially 2 or 3 layers.

The films may be made by any conventional film extrusion procedure known in the art including cast film and blown film extrusion. Thus the film may be produced by extrusion through an annular die and blowing into a tubular film by forming a bubble which is collapsed between nip rollers after solidification. This film can then be slit, cut or converted (e.g. gusseted) as desired. Conventional film production techniques may be used in this regard. If the film is a multilayer film then the various layers are typically coextruded. The skilled man will be aware of suitable extrusion conditions. Generally, however, extrusion is carried out at a temperature in the range 160° C. to 240° C., and cooled by blowing gas (generally air) at a temperature of 10 to 50° C. to provide a frost line height of up to 10 times, typically of 2 to 8 times the diameter of the die. The blow up ratio should generally be in the range 2 to 5, preferably 2.5 to 4.

The resulting films may have any thickness conventional in the art. Typically films may have a thickness of 6 to 200 µm, preferably 10 to 180 µm, e.g. 30 to 150 µm or 20 to 120 µm. If desired, the blend of the invention enables to go thicknesses of less than 100 µm, e.g. less than 50 µm, and even less than 20 µm while maintaining the good mechanical properties.

As previously mentioned the films of the invention have good processablity properties enabling reduction the film thickness and thus increase the production speed of film preparation process. The production speed can be increased, e.g. up to 20%, compared to conventional film preparation process of LDPE alone or in a mixture with LLDPE. Moreover, at least similar production speeds can be obtained with the blend of the invention as with conventional blends of based on LDPE and unimodal Cr-based HDPE polymers.

Moreover the HDPE composition, particularly when blended with other polymers, preferably with LDPE and/or LLDPE, more preferably with at least LDPE, provides remarkable good shrink properties. Shrink films of the invention may exhibit shrink of at least 15% in machine and/or transverse directions, especially at least 15% in both directions. Shrinks of at least 30% in both machine and transverse directions are also possible. Shrink of at least 50% in the machine direction is also within the scope of shrink films of the invention.

Furthermore, the film of the invention may also have very good mechanical properties, especially increased stiffness indicated as high tensile modulus values.

In a further embodiment of the invention the HDPE composition as defined above provides films with a low coefficient of friction (COF) so that it is not necessary to add slip agent.

Thus, the films of the invention have a wide variety of applications but are of particular interest in shrink film applications, especially where the films incorporate blends with at least a LDPE polymer.

The invention will now be described further with reference to the following non-limiting examples.

Analytical Test Method Descriptions

The following methods were used to measure the properties that are defined generally above and in examples below. Unless otherwise stated, the film samples used for the measurements and definitions were prepared as described under the particular film sample preparation method and in tables 1-3.

Density of the materials is measured according to ISO 1183:1987 (E), method D, with isopropanol-water as gradient liquid. The cooling rate of the plaques when crystallising the samples was 15 C/min. Conditioning time was 16 hours.

$MFR_2$ is measured according to ISO 1133 at 190° C. at load of 2.16 kg.

Dynamic Viscosity and Shear Thinning Index

Dynamic rheological measurements were carried out with a rheometer, namely Rheometrics RDA-II, on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade are made.

The values of storage modulus (G'), loss modulus (G") complex modulus (G*) and complex viscosity ($\eta^*$) were obtained as a function of frequency ($\omega$). $\eta_{100}$ is used as abbreviation for the complex viscosity at the frequency of 100 rad/s. Shear thinning index (SHI), which correlates with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

SHI value is obtained by calculating the complex viscosities $\eta^*$(2.7 kPa) and $\eta^*$(210 kPa) at a constant value of complex modulus of 2.7 kPa and 210 kPa, respectively. The shear thinning index SHI(2.7/210) is defined as the ratio of the two viscosities $\eta^*$(2.7 kPa) and $\eta^*$(210 kPa), i.e. $\eta$(2.7)/$\eta$(210).

The definitions and measurement conditions are also described in detail on page 8 line 29 to page 11, line 25 of WO 00/22040.

It is usually not practical to measure the complex viscosity at the value of frequency of 0.05 rad/s directly. The value can be extrapolated by conducting the measurements down to the frequency of 0.126 rad/s, drawing the plot of complex viscosity vs. frequency, drawing a best-fitting line through the five points corresponding to the lowest values of frequency and reading the viscosity value from this line.

Molecular weights, and molecular weight distribution, Mn, Mw and MWD were measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-4:2003. A Waters 150CV plus instrument, equipped with refractive index detector and online viscosimeter was used with 3×HT6E styragel columns from Waters (styrene-divinylbenzene) and 1,2,4-trichlorobenzene (TCB, stabilized with 250 mg/L 2,6-Di tert butyl-4-methyl-phenol) as solvent at 140° C. and at a constant flow rate of 1 mL/min. 500 μL of sample solution were injected per analysis. The column set was calibrated using universal calibration (according to ISO 16014-2:2003) with 15 narrow MWD polystyrene (PS) standards in the range of 1.0 kg/mol to 12 000 kg/mol. Mark Houwink constants were used for polystyrene and polyethylene (K: $9.54 \times 10^{-5}$ dL/g and su 0.725 for PS, and K: $3.92 \times 10^{-4}$ dL/g and a: 0.725 for PE). All samples were prepared by dissolving 0.5-3.5 mg of polymer in 4 mL (at 140° C.) of stabilized TCB (same as mobile phase) and keeping for 3 hours at 140° C. and for another 1 hours at 160° C. with occasional shaking prior sampling in into the GPC instrument.

Polydispersity

The polydispersity index PI is calculated according to the following equation:

$PI = 10^5 \, Pa/GC (PI = 100000 \, Pa/GC)$ wherein GC in Pa is the cross over modulus at which G'=G"=GC.

The rheology measurements have been made according to ISO 6421-10.

Measurements were made at 220° C. and 200° C. G' and G" indicate storage modulus and loss modulus, respectively. Measurements were made on a Physica MCR 300 rheometer with a plate-plate fixture, plate diameter 25 mm, and a distance between the plates of 1.8 mm.

Tensile modulus (secant modulus, 0.05-1.05%) is measured according to ASTM D 882-A on film samples prepared as described under the Film Sample preparation and in tables with film thickness as given for each test in below Tables 1 and 2. The speed of testing is 5 mm/min. The test temperature is 23° C. Width of the film was 25 mm.

Tear Resistance (Determined as Elmendorf Tear (N))

The tear strength is measured using the ISO 6383/2 method on film samples prepared as described under the "Film Sample preparation" and in tables with film thickness as given in Table 2 and 3. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Tensile Strain at break and tensile strength are measured according to ISO 527-3 on film samples prepared as described under the "Film Sample preparation" and in tables with film thickness as given in Table 2. The speed of testing is 500 mm/min. The test temperature is 23° C. Width of the film was 25 mm.

Tensile Stress at yield is measured according to ISO 527-3 on film samples prepared as described under the "Film Sample preparation" and in tables with film thickness as given in Table 2. The test temperature is 23° C. Width of the film was 25 mm.

"Free shrinkage"=Shrinkage test was made on film samples prepared as described under the "Film Sample preparation" and in tables with film thickness as given in Table 1.

Objective: To measure total contraction/shrink of film samples in MD (Machine Direction) and TD (Transverse Direction) at a constant temperature and at given time. Sample preparation: Prepare, 3 parallels both in MD and TD of actual film sample by punching (DIN 53455-3) 10×50 mm test specimens.

Test procedure: The samples are placed on a Mylar sheet covered with Talc in a heating chamber for 2 minutes. The temperatures chosen can be 160-165° C. or 180-185° C. The final length of each test specimen should be measured after removal from the heating chamber.

Calculation:

X= Length of test specimen after shrinkage (50−X) 100/50=% free shrinkage

"Shrink Force"

Objective: To measure Shrink Force potentials on film samples in MD (Machine Direction), TD (Transverse Direction) and at 45 degr. angle.

Definitions: Hot Shrink Force is a minor contraction/shrinkage that take place during the heating up phase.

Cold Shrink Force is the contraction/shrinkage that take place during cooling/recrystallisation phase.

Sample preparation: Prepare, 4 parallels both in MD, TD and 45 degr. angle of actual film sample by punching 15×115 mm test specimens.

Test procedure: The shrink test is performed in a special shrink force apparatus W-4242 equipped with 4 separate stations to fix the samples specimens, removal heating chamber and loading cells. A special software/PC is used to make the calculations and graphs (on the screen).

*Start with MD (always the highest forces), apply the heating chamber and start the heating up to 180 degr. C. during 90 sec.

Calculation: The apparatus will calculate the Hot shrink force in N (typical value<0.1 N) and Cold shrink force in N (typical value>0.5 N).

Draw down test was made on film samples prepared as described under the "Film Sample preparation" and in tables with film thickness as given in Table 2.

Objective: To produce on a film line at minimum film thickness with acceptable bubble stability and film appearance.

Definitions: Minimum Film Thickness is the final film thickness obtained by keeping constant output, kg/h, on extruder and successive increase the haul-off speed to bubble break.

Draw-down/Draw-down ratio is the relation between die gap and final film thickness (minimum film thickness)

Machine preparation: Standard temperatures and processing conditions for a given resin in mono-extrusion (Reifenhauser film line and Alpine film line).

Test procedure: Initial film thickness is 70-50 my for LDPE and 50-30 my for HDPE. By constant processing conditions increase the haul-off speed corresponding to 5 my stepwise decrease in film thickness. Stable film production is required in order to continue the stepwise downgauging.

Calculation: Minimum film thickness, my, is the thickness that can be produced on stable conditions in minim. 30 minutes.

Puncture resistance (determined in Ball puncture (energy/J) at +23° C. The method is according to ASTM D 5748. Puncture properties (resistance, energy to break, penetration distance) are determined by the resistance of film to the penetration of a probe (19 mm diameter) at a given speed (250 mm/min). Test was made on film samples prepared as described under the "Film Sample preparation" and in tables with film thickness as given in Table 2 and 3.

EXAMPLE 1

Component (1) of Blends

Component (1) of the invention, HDPE1: A multimodal HDPE1 polymer was prepared in a pilot scale multistage reactor system containing a loop reactor and a gas phase reactor. A prepolymerisation step preceded the actual polymerisation step. The prepolymerisation stage was carried out in slurry in a 50 dm$^3$ loop reactor at about 80° C. in a pressure of about 65 bar using the polymerisation catalyst prepared according to Example 3 of EP 688794 and triethylaluminium as the cocatalyst. The molar ratio of aluminium of the cocatalyst to titanium of the catalyst was about 20. Ethylene was fed in a ratio of (200 g of C2)/(1 g/catalyst). Propane was used as the diluent and hydrogen was feeded in amount to adjust the MFR2 of the prepolymer to about 10 g/10 min. The obtained slurry together with prepolymerised catalyst and triethyl aluminium cocatalyst were introduced into a 500 dm$^3$ loop reactor, wherein also a continuous feed of propane, ethylene and hydrogen was introduced. The feed ratio of H2/C2 was 395 mol/kmol. The loop reactor was operated at 95° C. temperature and 60 bar. The process conditions were adjusted to form polymer having an $MFR_2$ of 400 g/10 min and a density of about 970 kg/m$^3$.

The slurry was then transferred to a fluidised bed gas phase reactor, where also additional ethylene, 1-butene comonomer and hydrogen were added, together with nitrogen as an inert gas to produce the HMW component in the presence of the LMW component. The feed ratio of H2/C2 was 47.5 mol/kmol and the feed ratio of C4/C2 was 50 kg/t. The gas phase reactor was operated at a temperature of 80° C. and a pressure of 20 bar. The production rate of the polymer was 35.6 t/h to produce a final bimodal polymer with a production split of 43/57 (of loop/gpr reactors), whereby the final HDPE polymer having $MFR_2$ of 0.3 g/10 min and density of 945 kg/m$^3$.

The reactor powder was then stabilised with conventional additives and pelletized in a known manner using Kobe extruder (speed 1000 rpm and SEI of 190-224 kWh/t).

Component (1) of Comparative Blends 1 and 2, HDPE2:

A commercially available (i.a from Borealis) unimodal HDPE2 with a broad MWD of 12 was used as comparative Component (1). Said HDPE2 had $MFR_2$ of 0.4 g/10 min and density of 945 kg/m$^3$ and it was prepared using a conventional Cr catalyst.

EXAMPLE 2

Component (2) of Blends

Component (2) of Blend 1 of the Invention and Comparative Blend 1, LDPE1:

A commercial high pressure low density polyethylene available from Borealis and having a $MFR_2$ of 0.3 and a density 922 of kg/m$^3$.

Component (2) of Blend 2 of the Invention and Comparative Blend 2, LDPE2:

A commercial high pressure low density polyethylene available from Borealis and having a $MFR_2$ of 1.2 and a density 922 of kg/m$^3$.

Film Sample Preparation:

The film samples used in the examples of the invention and in the test runs of comparative or reference examples as described below in tables 1 to 3 were prepared on a Reifenhauser film line with L/D=25, die diameter 250 mm and die gap 1.5 mm. Further details for film preparation and thicknesses used in tests are given in the tables. The blends were prepared by an automatic mixing unit, and fed directly into the film extruder. Said film is produced according to the below conditions.

Extrusion conditions:

The blow up ratio (BUR) was 2.5:1.

The Frost Line Height (FLH): 600 mm above die.

The screw speed was 50 rpm.

Melt temperature, melt pressure, take-off speed; cooling conditions used for test runs of the examples, and the test results are listed in table 1.

TABLE 1

| | | | LDPE1 | LDPE1/HDPE1 (Blend 1 of Invention) | | LDPE1/HDPE2 (Comparative Blend 1) | |
|---|---|---|---|---|---|---|---|
| Wt ratio | | | | 95/5 | 85/15 | 95/5 | 85/15 |
| Film Thickness | μm | | 100 | 100 | 100 | 100 | 100 |
| Melt temp. | ° C. | | 208 | 207 | 208 | 209 | 208 |
| Melt Pressure | bar | | 210 | 197 | 202 | 190 | 199 |

TABLE 1-continued

Shrink test

| | | LDPE1 | LDPE1/HDPE1 (Blend 1 of Invention) | | LDPE1/HDPE2 (Comparative Blend 1) | |
|---|---|---|---|---|---|---|
| Take-Off Speed | m/min | 7 | 7 | 7 | 7 | 7 |
| Cooling | % | 64 | 64 | 64 | 64 | 64 |
| Shrinkage, MD | % | 75 | 77 | 78 | 76 | 76 |
| Shrinkage, TD | % | 36 | 30 | 32 | 32 | 28 |
| Shrink Force (Hot Shrink Force) MD/TD | N | 0.15/0.011 | 0.15/0.012 | 0.17/0.009 | 0.12/0.013 | 0.13/0.012 |
| Contracting Force (Cold Shrink Force) MD/TD | N | 3/1.8 | 2.9/1.9 | 3/1.7 | 3/1.65 | 3.3/1.8 |
| Shrink Rate MD/TD | % | 24/3.4 | 28/2 | 28/0 | 31/1.4 | 28/1.5 |
| Tensile Modulus, MD/TD | | 140/155 | 150/185 | 180/205 | 145/185 | 170/215 |

TABLE 2

Draw down properties of films made from blends

| | | LDPE2 | Blend 2 of Invention: LDPE2/HDPE1 | Comparative Blend 2: LDPE2/HDPE2 |
|---|---|---|---|---|
| Content, wt % | | 100 | 85/15 | 85/15 |
| Melt Temp. | °C. | 202 | 222 | 202 |
| Melt Pressure | bar | 210 | 158 | 157 |
| Take-Off Speed | m/min | 23 | >60 | >60 |
| Cooling | % | 64 | 66 | 64 |
| Bubble Stability | 30 μm film | OK | OK | OK |
| | 24 μm film | Bubble break. Not possible to run this film thickness | OK | OK |
| | 10 μm film | not possible to run | OK | Bubble break. Not possible to run this film thickness |
| | <10 μm film | not possible to run | Possible to run film at 9 μm | not possible to run |
| Draw Down Thickness | | 24 μm | 9 μm | 10 μm |
| Film Thickness | μm | 30 | 30 | 30 |
| Puncture Force at Break | N | 38 | 42 | 33 |
| Puncture Energy | J | 1 | 1.1 | 0.8 |
| Deformation | mm | 45 | 42 | 37 |
| Tensile Modulus, MD/TD | MPa | 200/250 | 260/300 | 210/270 |
| Stress at yield, MD/TD | MPa | 28.1/11.7 | 31.4/13.7 | 27.3/13.1 |
| Elmendorf tear resistance, MD/TD | N | 2.6/1.1 | 3.7/2.3 | 2.1/2.2 |

TABLE 3

Film properties for HDPE composition alone

| | | HDPE1 of Invention | HDPE1 of Invention | Comparative HDPE2 | Comparative HDPE2 |
|---|---|---|---|---|---|
| Content, wt % | | 100 | 100 | 100 | 100 |
| Melt Temp. | °C. | 206 | 206 | 206 | 206 |
| Melt Pressure | bar | 403 | 403 | 320 | 320 |
| Take-Off Speed | m/min | 39.2 | 39.2 | 37 | 37 |
| Output | Kg/h | 106 | 106 | 99 | 99 |
| Thickness distribution | 2-Sigma/% | 14 | 11.4 | 13.1 | 13.4 |
| Neck | | High neck | Low neck | High neck | Low neck |
| Film Thickness | μm | 25 | 25 | 25 | 25 |
| Puncture Force at Break | N | 43 | 34 | 40 | 33 |
| Puncture Energy | J | 1.6 | 1 | 1.5 | 1 |
| Deformation | mm | 54 | 41 | 56 | 39 |
| Tear resistance | N | 0.26 | 0.14 | 0.17 | 0.15 |

The invention claimed is:

1. A polymer blend suitable for the production of film, said polymer blend comprising at least (1) a multimodal high density polyethylene (HDPE) composition and (2) a low density polyethylene (LDPE) polymer, a linear low density polyethylene (LLDPE) polymer or a mixture of LDPE and LLDPE polymers, said HDPE composition comprising a multimodal HDPE polymer which contains at least a lower molecular weight (LMW) polyethylene component and a higher molecular weight (HMW) polyethylene component, wherein said HDPE polymer has a MFR$_2$ of 0.6 g/10 min or less, when determined according to ISO 1133 at 190° C. at load of 2.16 kg, and a density of at least 935 kg/m$^3$.

2. The blend as claimed in claim 1, wherein said HDPE polymer has an MFR$_2$ of 0.2 to 0.4 g/10 min.

3. The blend as claimed in claim 1, wherein said HDPE polymer has a density of 942 to 950 kg/m$^3$.

4. The blend as claimed in claim 3, wherein said HDPE polymer has a density of 943 to 948 kg/m$^3$.

5. The blend as claimed in claim 1, wherein the LMW component has a density of 950 to 980 kg/m$^3$.

6. The blend as claimed in claim 1, wherein the LMW component is an ethylene homopolymer.

7. The blend as claimed in claim 1, wherein the MFR$_2$ of the LMW component is 30 to 500 g/10 min.

8. The blend as claimed in claim 1 wherein the HDPE polymer has an SHI(2.7/210) of 20 to 45.

9. The blend as claimed in claim 1, wherein said HDPE polymer has an Mw/Mn of 10 to 30.

10. The blend as claimed in claim 1, wherein said component (2) is an LDPE.

11. The blend as claimed in claim 1, wherein the blend comprises HDPE composition (1) in an amount of up to 30 wt % of the total amount of the blend, and, as the component (2), a LDPE polymer, a LLDPE polymer or a mixture of LDPE and LLDPE polymers in an amount of 70 to 99 wt % of the total amount of the blend.

12. The blend as claimed in claim 1, wherein the component (2) is a mixture of LDPE and LLDPE polymers, wherein the amount of LDPE is at least 60 wt % of the amount of said LDPE/LLDPE mixture and the amount of LLDPE is up to 40 wt % of the amount of said LDPE/LLDPE mixture.

13. The blend as defined in claim 1, wherein LLDPE polymer is a multimodal LLDPE comprising at least a lower molecular weight (LMW) component and a higher molecular weight (HMW) component, and being produced using a Ziegler Natta or single site catalyst.

14. A mono- or multilayer film structure comprising at least one layer which comprises the blend as defined in claim 1.

15. A shrink film comprising a mono- or multilayer film as defined in claim 14.

16. The A process for preparing a film, comprising extruding a multimodal HDPE composition comprising a multimodal HDPE polymer which contains at least a LMW polyethylene component and a HMW polyethylene component, wherein said HDPE polymer has a MFR$_2$ of 0.6 g/10 min or less, when determined according to ISO 1133 at 190° C. at load of 2.16 kg, and a density of at least 935 kg/m , in a blend with a LDPE polymer, a LLDPE polymer or a mixture of LDPE or LLDPE polymers.

17. A process for the preparation of a film comprising extruding a polymer blend as defined in claim 1 to form a layer of mono- or multilayer film structure.

* * * * *